United States Patent Office 3,694,409
Patented Sept. 26, 1972

3,694,409
EPOXY RESIN CURED WITH A FATTY
TETRAAMINE
Eugene J. Miller, Jr., Wheaton, Ill., Ago Mais, Trenton,
N.J., and Donald J. Berenschot, Chicago, and Robert
L. Berger, Elmhurst, Ill., assignors to Armour Industrial
Chemical Company, Chicago, Ill.
No Drawing. Continuation-in-part of application Ser. No.
410,014, Nov. 9, 1964. This application May 8, 1968,
Ser. No. 727,675
Int. Cl. C08g 30/14
U.S. Cl. 260—47 EN
2 Claims

ABSTRACT OF THE DISCLOSURE

Use of tetraamines as epoxy resin curing agents.

This application is a continuation-in-part application of Ser. No. 410,014, filed Nov. 9, 1964, now U.S. Pat. 3,418,374 issued Dec. 24, 1968.

This invention relates to fatty tetraamines and their use as epoxy resin curing agents.

As discussed in the parent application, it has long been the desire of chemists to synthesize or to extract from natural substances compounds which not only possess the desirable physical and chemical properties of the long chain fatty acids, but also contain more reactive groups therein. With more reactive groups, the fatty compound would not only have good hydrophobic characteristics, but also have high potency, depending upon its reactive group type for surfactant, for polymeric, or for other chemical activities.

Among the approaches made toward accomplishing such an objective, that disclosed in U.S. 2,813,113 is typical. There the oxidation of oleic acid

[CH$_3$(CH$_2$)$_7$CH=CH(CH$_2$)$_7$COOH]

to azelaic acid [HOOC(CH$_2$)$_7$COOH] is discussed. Unfortunately, chain cleavage occurs in such oxidation. This is undesirable because it is detrimental to the hydrophobic nature of the resultant compound.

Roe and Swern of the U.S. Department of Agriculture, in the Journal of the American Oil Chemists Society periodical, volume 37, pages 661 to 668 (1960) report that unsaturated fatty acids may be carboxylated with carbon monoxide. The monoxide adds to the double bond. Such a reaction would conserve the hydrophobic nature of the fatty acid, but apparently no further work was done toward discovering new difunctional fatty compounds. This is unfortunate, because, as discussed below, it has been found that such difunctional compounds may be synthesized rather easily and they possess many attributes highly desirable for various chemical technologies.

In the parent application, novel tetraamines are taught which are indicated as being useful as epoxy resin curing agents. The teaching herein expands on such disclosure.

Accordingly, an object of this invention is to provide novel compounds which are useful as epoxy resin curing agents.

Another object is to provide a novel method for curing epoxy resins.

Other objects of the invention will in part be obvious and will in part appear hereinafter.

It has now been found that the novel fatty tetraamines of copending application Ser. No. 410,014 are good epoxy resin curing agents.

Such fatty tetraamines that are useful are those which fall within the following formula:

FORMULA I

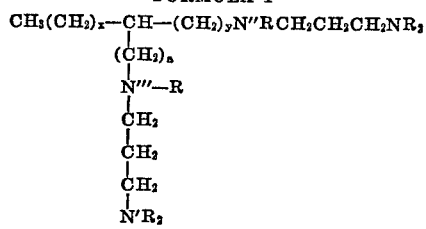

where

R is a radical selected from the group consisting of H⁻ and CH$_3$⁻
$a=0$ to 2
$x+y=6$ to 22

Among the fatty tetraamines which fall within the above formula are

N''',N''-di-(3-aminopropyl)aminomethylcaprylyl-
amine,
N''',N''-di-(3-aminopropyl)aminomethylcaprylamine,
N''',N''-di-(3-aminopropyl)aminomethyllaurylamine,
N''',N''-di-(3-aminopropyl)aminomethylmyristylamine,
N''',N''-di-(3-aminopropyl)aminomethylpalmitylamine,
N''',N''-di-(3-aminopropyl)aminomethylstearyl-
amine,
N''',N''-di-(3-aminopropyl)aminomethylarachidyl-
amine,
N''',N''-di-(3-aminopropyl)aminomethylbehenylamine,
N''',N''-di-(3-aminopropyl)aminomethyllignoceryl-
amine,
N''',N''-di-(3-aminopropyl)aminoethylcaprylylamine,
N''',N''-di-(3-aminopropyl)aminoethylcaprylamine,
N''',N''-di-(3-aminopropyl)aminoethyllaurylamine,
N''',N''-di-(3-aminopropyl)aminoethylmyristylamine,
N''',N''-di-(3-aminopropyl)aminoethylpalmitylamine,
N''',N''-di-(3-aminopropyl)aminoethylstearylamine,
N''',N''-di-(3-aminopropyl)aminoethylarachidylamine,
N''',N''-di-(3-aminopropyl)aminoethylbehenylamine,
N''',N''-di-(3-aminopropyl)aminoethyllignocerylamine, or mixtures thereof such as derivable from natural fats and oils such as tallow, soybean oil and coconut oil.

The epoxy resin may be in various forms, such as cast sheet, or film coating, form. Concentrations of 2 to 80% by weight tetraamine is required. It is mixed with the resin prior to the cure as will be shown hereinafter.

The invention accordingly comprises the several steps and the relation of one or more of such steps with respect to each of the others, and the composition possessing the characteristics, properties, and the relation of components which are exemplified in the following detailed disclosure, and the scope of the invention will be indicated in the claims.

Reference is now made to the following examples which illustrate the invention in detail:

EXAMPLE I

Mixing and slab preparation

The resin and curing agent indicated in Table 1 which follows are weighed together and mixed thoroughly but gently to avoid entrapment of air. The mix is poured into a mold 9" x 8" x 0.10" and allowed to gel and form a slab. After a period of twenty-four hours, the slab surface is checked to determine if it is tacky. Usually, two slabs of the same formulation are poured. One of the slabs is baked in a circulating oven at 300° F. for a definite period of time, while the other is left at room temperature for a period of seven days minimum to twenty days maximum.

Evaluation of cured castings

Each of the cast slabs prepared as above are evaluated for solvent and solution stability and hardness and electrical properties. Each casting, oven-cured and room-cured, is also evaluated for shrinkage. The data of Table 1 which follows shows the individual results determined on each formulation:

It should be evident from the data of Table 2 that N''',N''-di-(3-aminopropyl)aminomethylstearylamine is a superior curing agent to aminomethylstearylamine, even when lesser quantities are used.

EXAMPLE III

Further testing of N''',N''-di-(3-aminopropyl)aminomethylstearylamine (DMSA) with a commercially available epoxy resin (Epon 1001, a di-glycidyl ether of bisphenol A, as sold by Shell Chemical Company of Emery- TABLE 1
Properties of cast sheet of epoxy resin cured with amine curing agents

| Amine | Resin [1] amine wt. ratio | Cure | Solvent and solution stability (percent gain in weight) | | | | | | | Physical properties | | |
|---|---|---|---|---|---|---|---|---|---|---|---|---|
| | | | Toluene [2] | MIBK [2,3] | Mineral [4] spirits | 10% [4] Tide [5] | 10% [4] NaOH | 10% [4] $H_2SO$ | Deionized [4] $H_2O$ | Shrinkage | Hardness Shore D 10 sec. | Dielectric constant |
| MSA [6] | 70/30 | 300° F.; 1.5 hr | 8.30 | 3.03 | 0.19 | 0.42 | 0.23 | 0.92 | 0.28 | Slight | 73 | 2.93 |
| DMSA [7] | 70/30 | 300° F.; 2 hr | 1.54 | 0.4 | 0.03 | 0.52 | 0.28 | 3.22 | 0.35 | Nil | 76 | 3.10 |
| MSA | 69.2/30.8 | Room | 32.37 | 13.79 | 0.42 | 0.57 | 0.51 | 0.75 | 0.47 | Very slight | 76 | 3.06 |
| MSA | 69.2/30.8 | 300° F.; 1 hr | 10.26 | 4.08 | 0.15 | 0.48 | 0.37 | 0.91 | 0.46 | do | 76 | 2.99 |
| MSA [8] | 69.2/30.8 | Room | 50.5 | 26.2 | 0.28 | 0.61 | 0.86 | 0.61 | 0.39 | do | 75 | 3.12 |
| MSA | 70/30 | 300° F.; 1.5 hr | 8.30 | 3.03 | 0.19 | 0.42 | 0.23 | 0.92 | 0.28 | Slight | 73 | 2.93 |
| MSA [9] | 70/30 | 300° F.; 1 hr | 6.71 | 2.26 | | | | | | Nil | 74 | 3.03 |
| DMSA | 70/30 | Room | 7.57 | 2.17 | 0 | 0.29 | 0.22 | 2.35 | 0.34 | Nil | 75 | 3.31 |
| DMSA | 70/30 | 300° F.; 2 hr | 1.54 | 0.41 | 0.03 | 0.52 | 0.28 | 3.22 | 0.35 | Nil | 76 | 3.10 |
| DMSA | 75/25 | 300° F.; 1 hr | 1.78 | 0.59 | 0.09 | 0.48 | 0.30 | 2.49 | 0.33 | Slight | 77 | 3.08 |
| DMSA | 75/25 | Room | 9.43 | 3.39 | 0.06 | 0.26 | 0.26 | 0.85 | 0.27 | Very slight | 76 | 3.15 |
| Polyamide 786-95 [8] | 66⅔/33⅓ | do | 2.27 | 0.36 | 0.03 | 0.89 | 0.61 | 3.90 | 0.79 | Nil | 78 | 3.13 |
| Versamid 125 [9] | 66⅔/33⅓ | do | 13.98 | 3.33 | 0.07 | 0.74 | 0.46 | 1.18 | 0.60 | Nil | 77 | 3.11 |

[1] Epon 828 as sold by Shell Chemical Co., Emeryville, California, a di-glycidyl ether of bis-phenol A.
[2] 16 to 24 hours exposure.
[3] Methyl isobutyl ketone.
[4] 7 days exposure.
[5] Commercial household detergent.
[6] 9(10)-aminomethylstearylamine.
[7] N''',N''-di-(3-aminopropyl)aminomethylstearylamine.
[8] Reaction product of 9(10)-carboxystearic acid and triethylene tetraamine.
[9] As sold by General Mills, Kankakee, Illinois.

As is evident from the data of Table 1, the N''',N''-di-(3-aminopropyl)aminomethylstearylamine (DMSA) show excellent stability. Compared to aminomethylstearylamine and to other commercial amines recommended as epoxy resin curing agents, the DMSA cured slabs are superior.

EXAMPLE II

The resin and curing agent indicated in Table 2 which follows are mixed and used as a coating on an inert substrate. The cure applied to the wet coating composition is that indicated in the table.

ville, Calif.) will give values such as indicated in Table 3, which follows:

TABLE 3
Properties of a film coating of epoxy resin cured with DMSA [1]

| | |
|---|---|
| Epon 1001 (100%) (resin) (a di-glycidyl ether of bis-phenol (A) | 100.0 [2] |
| Silicone resin (flow control agent) | 1.00 [2] |
| N''', N''-di-(3-aminopropyl)aminomethylstearylamine (curing agent) | 13.70 [2] |
| DMP-30 (catalyst) | 3.00 [2] |
| Xylene (solvent) | 33.33 [2] |
| Cellosolve acetate (solvent) | 35.00 |
| Sweat in time (min.) | 45. |
| Gardner Holdt viscosity | "L". |
| Pot life (R.T.) | 8+ hrs. |
| Sward hardness after 24 hours | 48. |
| Sward hardness after 1 week | 60. |
| Impact: | |
| After baking (20 mins. at 375° F.): | |
| 8th inch mandrel | Passes. |
| Reverse impact | 160" lb. |
| After air dry (7 days at room temp.): | |
| 8th inch mandrel | Passes. |
| Reverse impact | 160" lb. |
| Methyl isobutyl ketone resistance | 72 to 96 hrs. |

[1] This coating dried in 20 minutes, tack free in two hours and was dried hard in 4½ hours.
[2] Parts by weight.

TABLE 2
Properties of film coating of an epoxy resin [1] cured with an amine curing agent

| Amine | Percent by wt. | Cure | Physical properties [2] | | | | | | | | | | | | |
|---|---|---|---|---|---|---|---|---|---|---|---|---|---|---|---|
| | | | Sward hardness, weeks film has aged— | | | | | | Impact | | | | | Flexibility | |
| | | | 1 | 2 | 3 | 4 | 5 | 6 | 1 | 2 | 3 | 4 | 6 | 10 | 5 | 10 |
| MSA [3] | 16.15 | Room | 20 | 22 | | | | | 160 | 160 | | 160 | 160 | Pass ⅛ | Pass ⅛ |
| | | Baked | 60 | 62 | | | | | 160 | | | 160 | 160 | do | Fail ⅛ |
| DMSA [4] | 14.14 | Room | 38 | | | 36 | | | | 160 | 160 | 160 | | do | |
| | | Baked | 24 | | | 26 | | | | | 160 | 160 | 1 | do | |

[1] Epon 1001 as sold by Shell Chemical Co., Emeryville, Calif. a di-glycidyl ether of bis-phenol A.
[2] Of representative samples.
[3] 9(10)-aminomethylstearylamine.
[4] N''', N''-di-(3-aminopropyl)aminomethylstearylamine.

From Table 3, it should be evident that Epon 1001, when cured with N''',N''-di-(3-aminopropyl)aminomethylstearylamine, has very good flexibility. Its solvent resistance, even after methyl isobutyl ketone immersion for four days, is far better than any other amine tested.

It will thus be seen that the objects set forth above, among those made apparent from the preceding description, are efficiently attained, and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described what is claimed is:

1. A method for curing 1,2-epoxy resin comprising admixing an epoxy resin precursor with 2 to 80% by weight of a fatty tetraamine falling within the following formula:

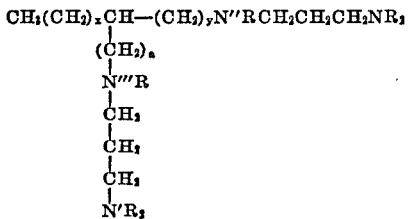

wherein
R is a radical selected from the group consisting of H$^-$ and CH$_3^-$
$a = 0$ to 2
$x + y = 6$ to 22 and curing the mixture by raising the temperature thereof for a period of time sufficient to cause polymerization.

2. A cured epoxy resin consisting of the reaction product of (1) the reaction product of 2,2-bis-(p-hydroxyphenyl)propane with epichlorohydrin and (2) 2 to 80% by weight of a fatty tetraamine falling within the following formula:

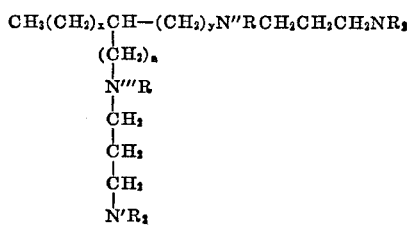

wherein
R is a radical selected from the group consisting of H$^-$ and CH$_3^-$
$a = 0$ to 2
$x + y = 6$ to 22.

References Cited

UNITED STATES PATENTS

| | | | |
|---|---|---|---|
| 3,223,654 | 12/1965 | Nickerson et al. | 260—2.5 |
| 2,865,886 | 12/1958 | Greenlee | 260—47 |
| 3,418,374 | 12/1968 | Miller et al. | 260—583 |

WILLIAM H. SHORT, Primary Examiner

E. A. NIELSEN, Assistant Examiner

U.S. Cl. X.R.

260—2 N, 18 EP